United States Patent
Sasami (10) Patent No.: US 12,457,296 B2
(45) Date of Patent: Oct. 28, 2025

(54) CONTINUOUS SHEET IMAGE FORMING SYSTEM WITH IMPROVED DEFECT CORRECTION AND REPRINTING

(71) Applicant: Konica Minolta, Inc., Tokyo (JP)

(72) Inventor: Shingo Sasami, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 140 days.

(21) Appl. No.: 18/318,920

(22) Filed: May 17, 2023

(65) Prior Publication Data

US 2023/0412738 A1 Dec. 21, 2023

(30) Foreign Application Priority Data

May 17, 2022 (JP) .................. 2022-080652

(51) Int. Cl.
*H04N 1/00* (2006.01)

(52) U.S. Cl.
CPC ..... *H04N 1/00015* (2013.01); *H04N 1/00037* (2013.01); *H04N 1/00082* (2013.01)

(58) Field of Classification Search
CPC ........... H04N 1/00015; H04N 1/00037; H04N 1/00082
See application file for complete search history.

(56) References Cited

U.S. PATENT DOCUMENTS

| | | | | |
|---|---|---|---|---|
| 9,235,790 B2* | 1/2016 | Hiramatsu | | H04N 1/00084 |
| 10,509,609 B2* | 12/2019 | Ito | | H04N 1/00037 |
| 10,623,587 B2* | 4/2020 | Tsukamoto | | H04N 1/00029 |
| 10,747,165 B2* | 8/2020 | Asakawa | | G03G 15/6538 |
| 11,230,121 B2* | 1/2022 | Chuto | | B41J 11/0095 |
| 2008/0151307 A1* | 6/2008 | Minamida | | H04N 1/00018 358/3.24 |
| 2013/0301070 A1* | 11/2013 | Saisho | | H04N 1/32358 358/1.13 |
| 2020/0241816 A1* | 7/2020 | Miyazaki | | G06F 3/1234 |
| 2022/0299922 A1* | 9/2022 | Mashiko | | G06F 3/121 |

FOREIGN PATENT DOCUMENTS

| | | | |
|---|---|---|---|
| JP | 2004-004398 | | 1/2004 |
| JP | 2007-079570 | | 3/2007 |
| JP | 2011116039 | A * | 6/2011 |
| JP | 2012203015 | A * | 10/2012 |

(Continued)

*Primary Examiner* — Scott A Rogers (74) *Attorney, Agent, or Firm* — BakerHostetler (57) ABSTRACT

Disclosed is an image forming system that includes: a sheet conveyance section that conveys a continuous sheet along a sheet conveyance path; an image forming section that forms an image on the continuous sheet; and an image reading section that is disposed downstream of the image forming section in the sheet conveyance path, and reads the image formed on the continuous sheet to generate image data; and a hardware processor that determines, based on the read image data, whether or not there is an image defect, and determines, based on a result of the determination regarding the image defect, whether or not to perform reprinting of an image that is determined to have an image defect. The hardware processor continues operation of the image forming section until determining not to perform the reprinting.

14 Claims, 7 Drawing Sheets

(56) References Cited

FOREIGN PATENT DOCUMENTS

| | | | | |
|---|---|---|---|---|
| JP | 2014144627 | A | * | 8/2014 |
| JP | 2015120264 | A | * | 7/2015 |
| JP | 2017177430 | A | * | 10/2017 |
| JP | 2020-044789 | | | 3/2020 |
| JP | 2024060464 | A | * | 5/2024 |

* cited by examiner

CONTINUOUS SHEET IMAGE FORMING SYSTEM WITH IMPROVED DEFECT CORRECTION AND REPRINTING

REFERENCE TO RELATED APPLICATIONS

This application claims priority to Japanese Patent Application No. 2022-080652 filed on May 17, 2022, the entire disclosure of which is incorporated herein by reference in its entirety.

TECHNICAL FIELD

The present invention relates to an image forming system and a recording medium.

DESCRIPTION OF THE RELATED ART

Conventionally, there has been known an image forming apparatus that forms an image on a continuous sheet as an image recording medium. For example, there is known an image forming apparatus that performs first printing (normal printing) on a continuous sheet, inspects images obtained after cutting the continuous sheet, and reprints a defective image or an image included in a defectively cut portion at the end of the continuous sheet (see Japanese Unexamined Patent Publication No. 2020-44789). This image forming apparatus facilitates correction work of the developed products (output products).

On the other hand, for the purpose of preventing deterioration of the materials such as the photoreceptor and the developer, the image forming section is generally stopped immediately after image formation processing for normal printing of the last image is completed.

For example, there is known an image forming apparatus in which a photoreceptor drum serving as an image forming section is separated from an intermediate transfer belt and stopped immediately after completion of image formation processing of the last image (see Japanese Unexamined Patent Publication No. 2004-4398, Japanese Unexamined Patent Publication No. 2007-79570).

SUMMARY OF THE INVENTION

The image forming apparatus described in Japanese Unexamined Patent Publication No. 2004-4398A stops the image forming section after the image formation processing. Then, when the image near the last image is determined to be defective after completion of the image formation processing of the last image in the normal printing, the image forming section has been already stopped or is in the process of stopping. Therefore, the image forming apparatus needs to restart the image forming section in order to reprint the defective portion. The image forming apparatus has a problem of processing time. That is, it takes time to restart the image forming section. Not only this, since the image forming apparatus continues conveyance of the continuous sheet also during the restart, another problem is that a large blank portion may be produced between the last image of the normal printing and the reprint image.

In particular, the image forming apparatus temporarily stops the image forming section and thereafter restart it. Therefore, the image forming apparatus may suffer from a slight change of the image quality that occurs between the last image of normal printing and an image of reprinting due to fluctuation in high-voltage output, speed, and torque of various control loads.

An object of the present invention is to reduce a blank portion between the last image in normal printing and a reprint image and a change in image quality between them when reprinting is performed on a continuous sheet.

To achieve at least one of the abovementioned objects, according to an aspect of the present invention, an image forming system reflecting one aspect of the present invention comprises:
a sheet conveyance section that conveys a continuous sheet along a sheet conveyance path;
an image forming section that forms an image on the continuous sheet;
an image reading section that is disposed downstream of the image forming section in the sheet conveyance path, reads an image formed on the continuous sheet to generate image data; and
a hardware processor that determines, based on the read image data, whether or not there is an image defect, and determines, based on a result of the determination regarding the image defect, whether or not to perform reprinting of an image that is determined to have an image defect, wherein
the hardware processor continues operation of the image forming section until determining not to perform the reprinting.

To achieve at least one of the abovementioned objects, according to an aspect of the present invention, a computer-readable recording medium reflecting one aspect of the present invention, the recording medium storing a program for an image forming system,
the image forming system comprises:
a sheet conveyance section that conveys a continuous sheet along a sheet conveyance path;
an image forming section that forms an image onto the continuous sheet; and
an image reading section that is disposed downstream of the image forming section in the sheet conveyance path, reads an image formed on the continuous sheet to generate image data,
the program causing a computer of the image forming system to function as a hardware processor that determines, based on the read image data, whether or not there is an image defect, and determines, based on a result of the determination regarding the image defect, whether or not to perform reprinting of an image that is determined to have an image defect, wherein
the hardware processor continues operation of the image forming section until the hardware processor determines not to reprint an image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein.

DETAILED DESCRIPTION

An embodiment of the present invention will be described in detail with reference to the accompanying drawings. However, the scope of the invention is not limited to the disclosed embodiments.

Figure 1:
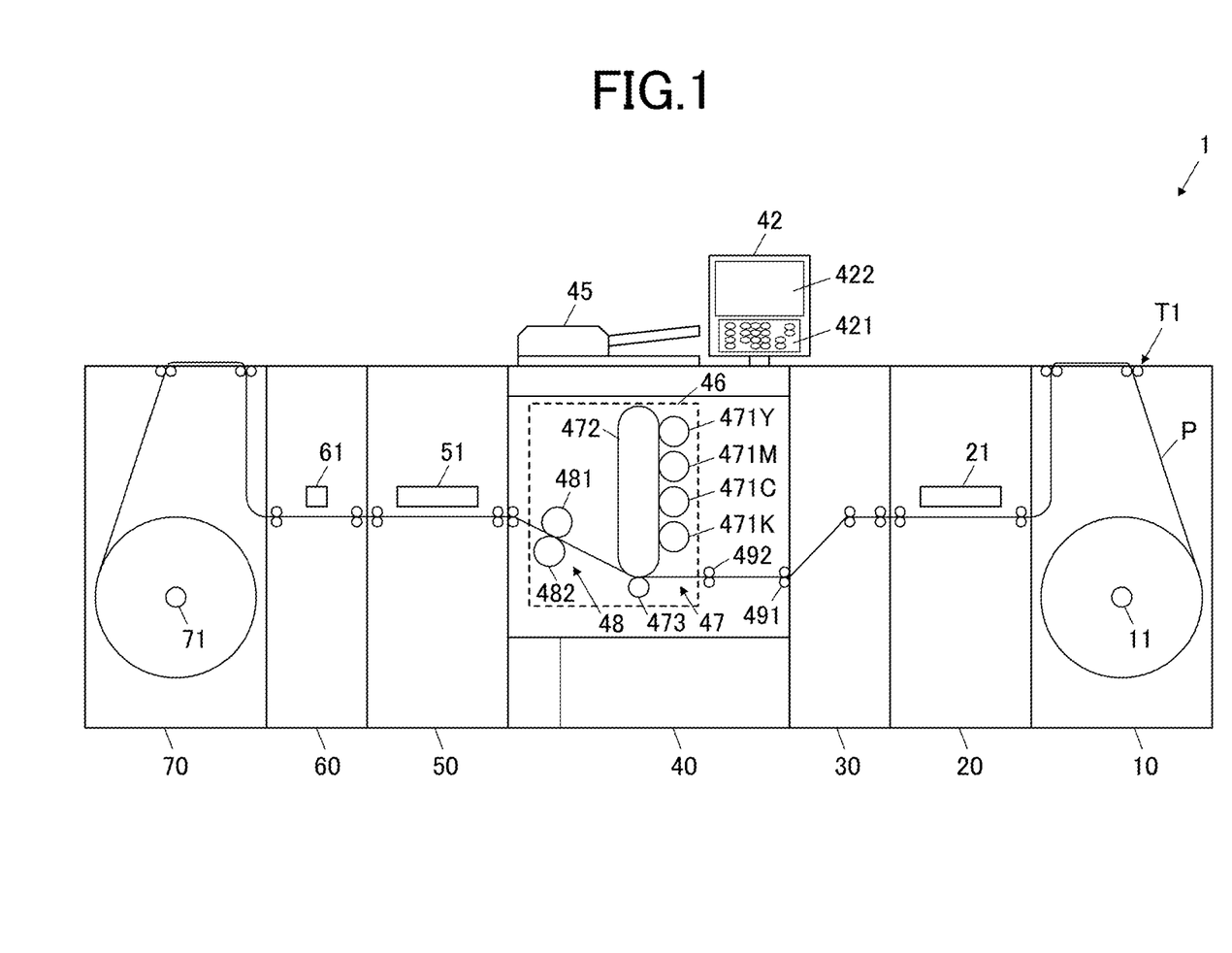
FIG. 1 is a schematic configuration view of an image forming system 1 according to an embodiment of the present invention.
Figure 2:
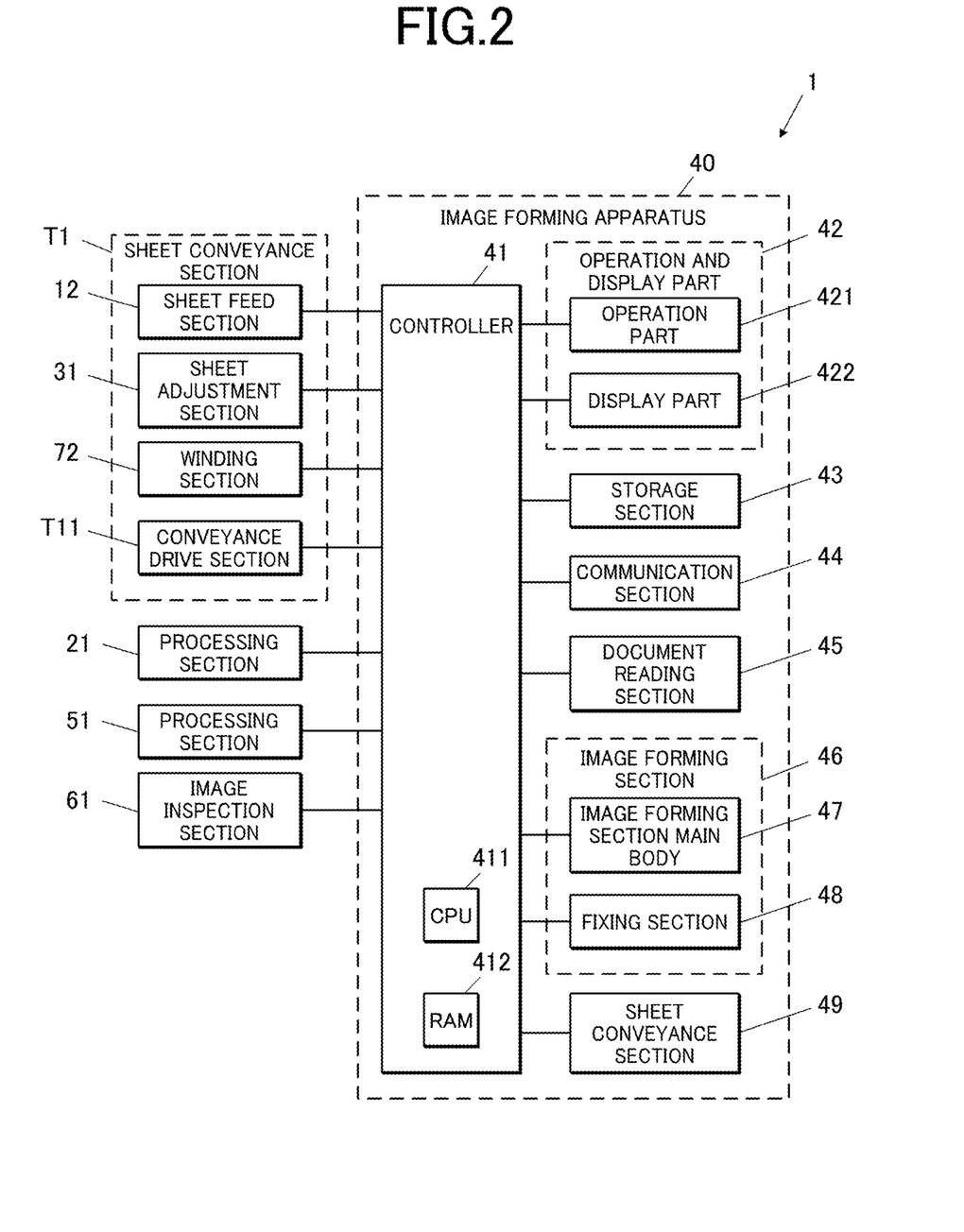
FIG. 2 is a block diagram illustrating the functional configuration of the image forming system.

With reference to FIGS. 1 and 2, the device configuration of the present embodiment will be described. FIG. 1 is a schematic configuration view of an image forming system 1 according to the present embodiment. FIG. 2 is a block diagram illustrating the functional configuration of the image forming system 1.

As illustrated in FIG. 1, the image forming system 1 of the present embodiment includes a sheet feed device 10, a processing device 20, a sheet adjustment device 30, an image forming apparatus 40, a processing device 50, an image inspection device 60, and a winding device 70. In the image forming system 1, the sheet conveyance path of a continuous sheet P runs through the sheet feed device 10, the processing device 20, the sheet adjustment device 30, the image forming apparatus 40, the processing device 50, the image inspection device 60, and the winding device 70 in the written order from the upstream to the downstream.

The sheet feed device 10 feeds the continuous sheet P to the downstream of the sheet conveyance path, for example to the image forming apparatus 40. In the housing of the sheet feed device 10, for example, as illustrated in FIG. 1, a roll of the continuous sheet P is wound around a support shaft 11 and is held rotatably. The sheet feed device 10 conveys the continuous sheet P wound around the support shaft 11 to the processing device 20 at a constant speed. In this process, the sheet feed device 10 conveys the continuous sheet P along a conveyance path in which the continuous sheet P is once exposed on an upper surface of the apparatus and then enters the apparatus again via a plurality of conveyance rollers. The portion of the sheet feed device 10 for exposing the continuous sheet P is used as a space for cutting the continuous sheet P with a cutter knife or the like and connecting the continuous sheet P to a new roll sheet.

The support shaft 11 of the sheet feeding device 10, the conveyance rollers for the continuous sheet P, a drive section such as a motor, and the like in the housing constitute a sheet feeding section 12 (FIG. 2). The sheet feed device 10 is configured such that the continuous sheet P is installed as a roll sheet but is not limited thereto. The sheet feed device 10 may be configured such that the continuous sheet P is installed in another state such as a folded state. The continuous sheet P is not limited to paper and may be any medium such as film. In the image forming system 1, the conveyance portions for the continuous sheet P other than the image forming apparatus 40 are referred to as a sheet conveyance section T1. The sheet conveyance section T1 includes the sheet feed section 12, a sheet adjustment section 31 (described later) of the sheet adjustment device 30, a winding section 72 (described later) of the winding device 70, and a conveyance drive section T11 of the processing devices 20, 50 and the image inspection device 60 (FIG. 2).

The processing device 20 performs predetermined processing on the continuous sheet P conveyed from the sheet feed device 10 and conveys the continuous sheet P to the downstream via a plurality of conveyance rollers. Examples of the predetermined processing include various kinds of processing before image formation by the image forming apparatus 40, such as entire surface varnishing and flexographic printing. The flexographic printing is a process of coating the entire surface of a transparent film as the continuous sheet P with white or special color ink or toner by full-page printing A drive section that performs the processing of the processing device 20 is referred to as a processing section 21, and a conveyance roller and a motor for the continuous paper P in the housing of the processing device 20 constitutes a conveyance drive section T11 (FIG. 2).

The sheet adjustment device 30 adjusts the height of the continuous sheet P conveyed from the processing device 20 via a plurality of conveyance rollers and conveys the continuous sheet P to the downstream. The sheet adjustment device 30 may be configured to apply tension to the continuous sheet P. A drive section that adjusts the height of the continuous paper P, including a conveyance roller and a motor for the continuous paper P in the housing of the sheet adjustment device 30, is referred to as a sheet adjustment section 31 (FIG. 2).

The image forming apparatus 40 performs image formation (toner image forming and fixing) on the continuous sheet P conveyed from the sheet feed device 10 and conveys the continuous sheet P to the downstream. The image forming apparatus 40 includes an operation and display part 42, a document reading section 45, an image forming section 46, and a sheet conveyance section 49.

The operation and display part 42 includes an operation part 421 and a display part 422. The operation part 421 includes various keys and a touch screen integrally formed on a display screen of the display part 422 and receives a key press input or a touch input of a user. The display part 422 includes a display panel such as a liquid crystal display (LCD) or an electro-luminescence (EL) display and displays various kinds of display information.

The document reading section 45 includes an automatic document feeder (ADF) and an image reading section such as a charge coupled device (CCD). The document reading section 45 reads an image of an original document based on the setting information received through the operation part 421 and generates image data of the read image. More specifically, the document reading section 45 conveys a document placed on a document tray of the ADF to an exposure glass, which is a reading portion, or places the document on a platen glass. The document reading section 45 reads the image(s) on one side or both sides of the document by the image reading section and generates the image data thereof.

The image forming section 46 includes an image forming section main body 47 and a fixing section 48. The image forming section main body 47 forms an image on the continuous sheet P that is supplied from the sheet adjustment section 31 to the image forming apparatus 40 and conveyed through the sheet conveyance section 49 (a conveyance roller 491 and a registration roller 492).

The image forming section main body 47 includes image forming units 471Y, 471M, 471C, and 471K for respective colors of yellow (Y), magenta (M), cyan (C), and black (K), an intermediate transfer belt 472, a secondary transfer roller 473, and the like. Each of the image forming units 471Y, 471M, 471C and 471K includes a photosensitive drum, a charging section, an exposure section, a developing section, a primary transfer roller, and a cleaning section.

The components of the yellow image forming unit 471Y will be described. The photosensitive drum is a rotational body on which a yellow toner image is formed. The charging section uniformly charges the photosensitive drum. The exposure section forms an electrostatic latent image by scanning and exposing the surface of the photosensitive drum with a beam such as a laser beam based on a yellow component of the image data on an image to be formed. The developing section stores yellow toner and develops the electrostatic latent image on the photosensitive drum by depositing the yellow toner thereon. The primary transfer roller transfers the yellow toner image formed on the photosensitive drum onto the intermediate transfer belt 472 (primary transfer). The cleaning section removes a residual toner on the photosensitive drum. The components of the magenta, cyan, and black image forming units 471M, 471C and 471K are the same as the components of the yellow image forming unit 471Y except for the color (toner).

The intermediate transfer belt 472 is an endless belt onto which toner images formed on the photosensitive drums of the respective colors of the image forming units 471Y, 471M, 471C, and 471K are sequentially transferred. The secondary transfer roller 473 transfers the four-color toner images formed on the intermediate transfer belt 472 onto a sheet (secondary transfer).

The fixing section 48 fixes the toner images transferred on the continuous sheet P by the image forming section main body 47. The fixing section 48 includes a pair of rollers, which is for example, a heating roller 481 and a pressure roller 482 for nipping the continuous sheet P. The heating roller 481 is heated to a predetermined temperature by a heater serving as a heat source. The pressure roller 482 comes into pressure contact with or separates from the heating roller 481. The continuous sheet P on which the toner image is transferred is heated and pressed when passing through the nip part between the heating roller 481 and the pressure roller 482, and the toner image is thereby fused and fixed onto the continuous sheet P. The continuous sheet P on which the toner image is fixed by the fixing section 48 is conveyed via the sheet conveyance section 49 (conveyance roller 491) and is ejected from the image forming apparatus 40. The fixing section 48 can control the pressure contact of the heating roller 481 and the pressure roller 482 against the continuous sheet P. Furthermore, the sheet conveyance section T1 and 49 can control the pressure contact of the conveyance roller pair against the continuous sheet P.

The processing device 50 performs predetermined processing on the continuous sheet P conveyed from the image forming apparatus 40 and conveys the continuous sheet P to the downstream via a plurality of conveyance rollers. The predetermined processing may be various kinds of processing after the image formation by the image forming apparatus 40, such as spot varnishing and punching. The spot varnishing is a varnish processing that is performed on a part of the surface of the continuous sheet P. The punching is a processing of removing a part of the continuous sheet P. A drive section for performing the processing of the processing device 50 is referred to as a processing section 51. A conveyance roller and a motor for the continuous sheet P in the housing of the processing device 50 constitute the conveyance drive section T11 (FIG. 2).

The image inspection device 60 optically reads the continuous sheet P conveyed from the processing device 50 with a sensor such as a line sensor, generates image data for inspection, and conveys the continuous sheet P to the downstream. A drive section that performs the image reading process of the image inspection device 60 is referred to as an image inspection section 61 as an image reading section. The conveyance roller and the motor for the continuous sheet P in the housing of the image inspection device 60 constitute the conveyance drive section T11 (FIG. 2).

The winding device 70 winds the continuous sheet P transported from the image inspection device 60. Specifically, the winding device 70 conveys the continuous sheet P from the image inspection device 60 along a conveyance path in which the continuous sheet P passes through a plurality of conveyance rollers, is once exposed on the upper surface of the apparatus, and then enters the apparatus again. The winding device 70 winds the conveyed continuous sheet P around the support shaft 71 at a constant speed and holds the continuous paper P in a roll shape. The portion for exposing the continuous paper P of the winding device 70 is used as a space for checking the quality of the continuous sheet P after printing.

A drive section such as the support shaft 71, and the conveyance roller and the motor in the housing of the winding device 70 is referred to as a winding section 72 (FIG. 2).

The device configuration of the image forming system 1 is not limited to the configuration in FIG. 1. For example, in the image forming system 1, the image forming apparatus 40 may not include the document reading section 45 or may not include at least one of the processing device 20 and the processing device 50.

The internal functional (circuit) configuration of the image forming system 1 will be described with reference to FIG. 2. As illustrated in FIG. 2, the image forming system 1 includes the sheet conveyance section T1, the processing section 21 of the processing device 20, the image forming apparatus 40, the processing section 51 of the processing device 50, and the image inspection section 61 of the image inspection device 60. The sheet conveyance section T1 includes the sheet feed section 12 of the sheet feed device 10, the sheet adjustment section 31 of the sheet adjustment device 30, the winding section 72 of the winding device 70, and the conveyance drive sections T11 including the conveyance rollers and the motors of the processing devices 20, 50.

The image forming apparatus 40 includes a controller 41, an operation and display part 42, a storage section 43, a communication section 44, a document reading section 45, and an image forming section 46. The operation and display part 42 includes an operation part 421 and a display part 422. The image forming section 46 includes the image forming section main body 47 and the fixing section 48.

The controller 41 includes a central processing unit (CPU) 411, a random access memory (RAM) 412, and the like. The CPU 411 reads various programs such as a system program and an application program stored in the storage section 43, develops the programs in the RAM 412, and executes various processing in cooperation with the developed programs.

The operation part 421 receives a user's operation input and outputs the operation information thereof to the controller 41. The display part 422 displays various display information on the display panel based on the display information input from the controller 41.

The storage section 43 includes, for example, a hard disk drive (HDD), a solid-state drive (SSD), or the like, and stores programs to be executed by the controller 41 and data such as image data in a readable and writable manner. In particular, the storage section 43 stores an image forming program for performing image formation processing described below.

The communication section 44 includes a network card or the like and communicates with an external device such as a personal computer (PC). For example, under the control of the controller 41, the communication section 44 receives image data for image formation from the external device and outputs the image data to the controller 41.

The document reading section 45 reads the image of a set document, generates image data of the read image, and outputs the image data to the controller 41 under the control of the control unit 41.

The image forming section main body 47 forms toner images of YMCK on the continuous sheet P based on the image data generated by the document reading section 45 or the image data received from the external device via the communication section 44 under the control of the controller 41. The fixing section 48 heats and presses the toner images formed on the continuous sheet P by the image forming section main body 47 to fix the toner images onto the continuous sheet P under the control of the controller 41.

The sheet feed section 12 feeds the continuous sheet P by rotating the support shaft 11 and conveys the fed continuous sheet P to the downstream processing device 20 under the control of the controller 41. The processing section 21 performs or does not perform processing on the continuous sheet P conveyed from the sheet feed device 10 under the control of the controller 41. The conveyance drive section T11 conveys the continuous sheet P, which has been processed or not processed by the processing section 21, to the downstream sheet adjustment device 30 under the control of the controller 41.

The sheet adjustment section 31 conveys the continuous sheet P conveyed from the processing device 20 to the downstream image forming apparatus 40 by the conveyance roller under the control of the controller 41. Under the control of the controller 41, the processing section 51 processes or does not process the continuous sheet P conveyed from the image forming apparatus 40 on which the image formation has been performed. The conveyance drive section T11 conveys the continuous sheet P, which has been processed or not processed by the processing section 51, to the downstream image inspection device 60 under the control of the controller 41.

Under the control of the controller 41, the image inspection section 61 reads the image on the continuous sheet P conveyed from the processing device 50 to generate image data, and outputs the image data to the controller 41. The conveyance drive section T11 transports the continuous sheet P, the image on which has been read by the image inspection section 61, to the downstream winding device 70 under the control of the controller 41. Under the control of the controller 41, the winding section 72 conveys the continuous sheet P conveyed from the image inspection device 60 to the support shaft 71, and winds and holds the conveyed continuous sheet P around the support shaft 71.

Figure 3:
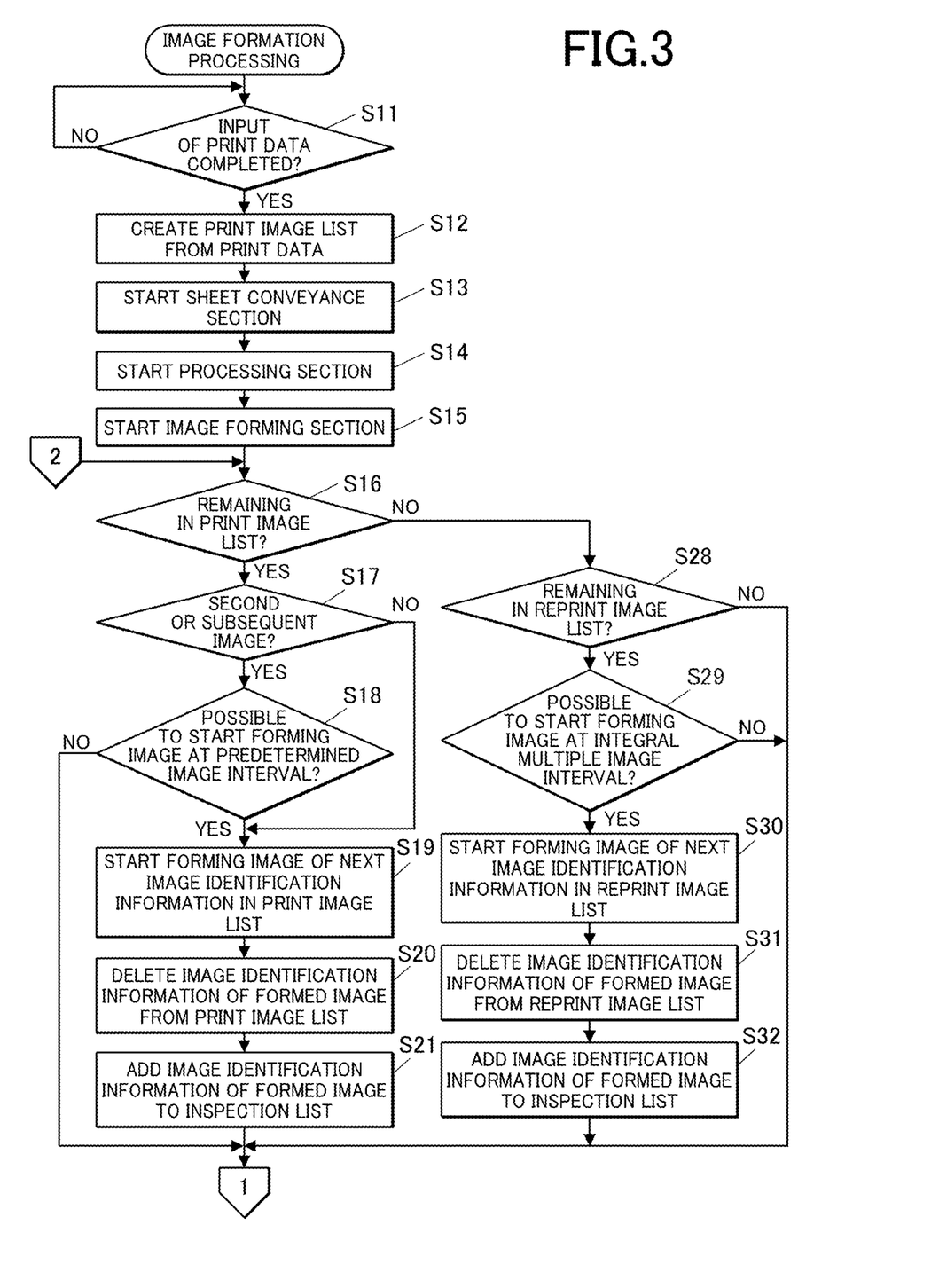
FIG. 3 is a flowchart illustrating image formation processing.
Figure 4:
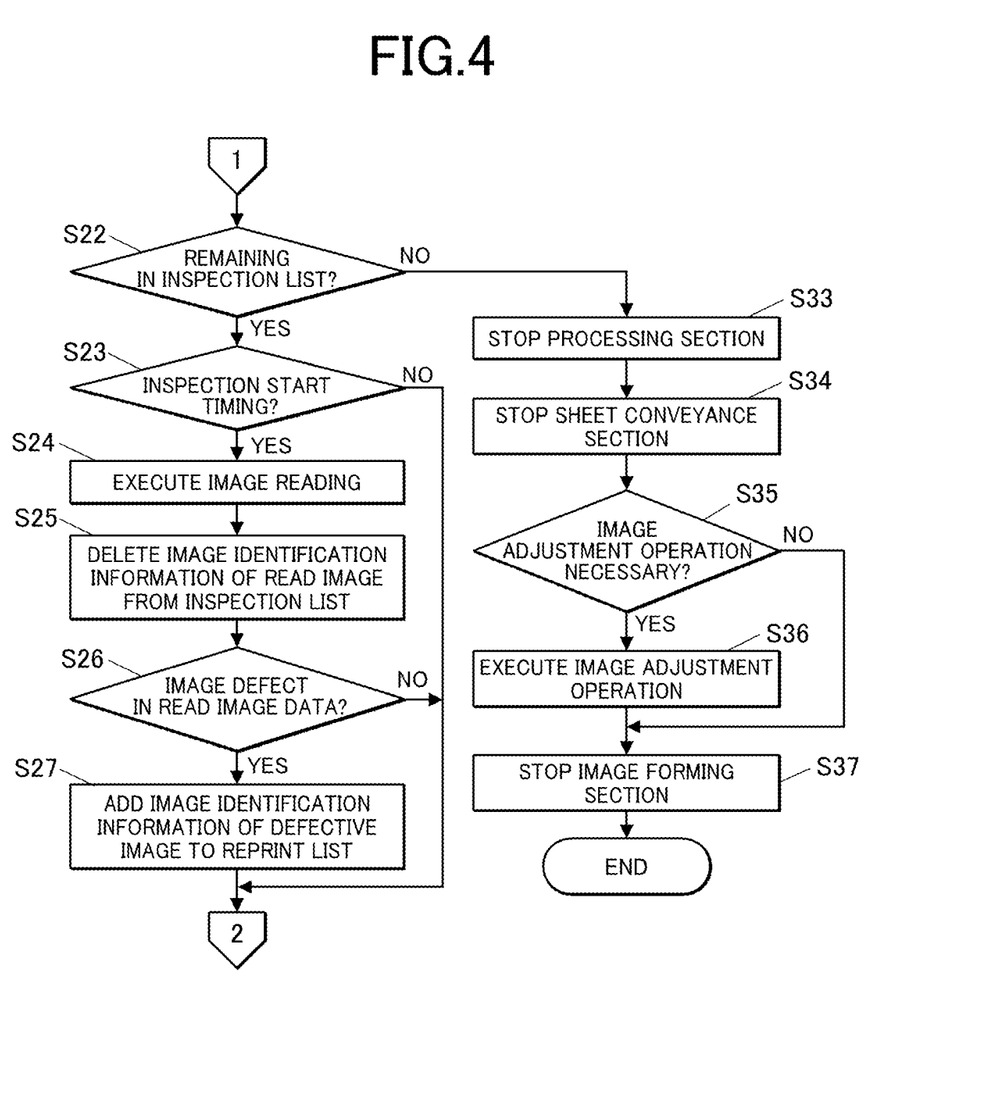
FIG. 4 is a flowchart illustrating the image formation processing that is a continuation of FIG. 3.

The operation of the image forming system 1 will be described with reference to FIGS. 3 and 4. FIG. 3 is a flowchart illustrating image formation processing; FIG. 4 is a flowchart illustrating the image formation processing that is a continuation of FIG. 3.

In the image forming system 1, the storage section 43 of the image forming apparatus 40 stores preset image forming condition information, sheet setting information, and setting information. The image forming condition information relates to the image formation to e performed by the image forming section 46. The sheet setting information includes processing information on the type and details of processing to be performed by the processing devices 20 and 50, the paper type and basis weight of the continuous sheet P on which image formation is performed, and the like. The setting information includes sheet conveyance condition information selectable according to the sheet, and image adjustment information including the type and details of the image adjustment processing to be executed. The sheet conveyance condition information includes the conveyance speed of the continuous sheet P and the state of the pressure contact by the fixing section 48 (sheet conveyance sections T1 and 49).

The conveyance condition information includes the conveyance speed of the continuous sheet P during the image formation. The image adjustment information includes image density adjustment information, color registration adjustment information, and waste band information. The image density adjustment information is related to adjustment of the image forming section main body 47 for adjusting the density of the image to be formed on the continuous sheet P. The color registration adjustment information is related to adjustment of image forming positions of the image forming units 471Y, 472M, 472C, 472K for preventing misregistration of Y, M, C, and K color images on the continuous sheet P. A waste band is a solid band that is formed in a region that does not affect a finished product of the continuous sheet P and is formed in order to avoid scumming that occurs in a non-printing area. The waste band information includes whether to form a waste band and the details of the waste band. The setting information stored in the storage section 43 of the image forming apparatus 40 can be appropriately changed according to a user input of various kinds of setting information for printing input via the operation part 421.

In the image forming system 1, a user input of an instruction to execute image formation processing and/or a user input of an instruction to input image data for printing (referred to as print data) via the operation part 421 serve as a trigger of starting the image formation processing. In response to the trigger, the controller 41 executes the image formation processing in accordance with an image forming program stored in the storage section 43. The input of print data is performed by the document reading section 45 reading a document to generate print data or by the communication section 44 receiving print data from an external device. The input print data includes at least one image and is stored in the storage section 43.

As illustrated in FIG. 3, first, the controller 41 determines whether the input (and storage) of print data to be printed has been completed (step S11). When the input of the print data is not completed (step S11; NO), the processing proceeds to step S11.

When the input of the print date is completed (step S11; YES), the controller 41 assigns image identification information (for example, an image identification number) for identifying each of at least one image of the print data to be printed (step S12). In Step S12, the controller 41 creates a print image list by arranging at least one image identification information in the order of image formation and stores the created print image list in the RAM 412. The print image list is a list of image identification information in the order of image formation in normal printing. The controller 41 selects the sheet conveyance condition information based on the sheet setting information of the continuous sheet P, which is included in the setting information stored in the storage section 43 (step S13). In step S13, the controller 41 activates the sheet conveyance sections T1, 49 in accordance with the selected sheet conveyance condition information to start conveyance of the continuous sheet P. From step S13 until step S34 described below, the continuous sheet P is conveyed by the sheet conveyance sections T1, 49 in the same conveyance conditions specified in the sheet conveyance condition information.

The controller 41 activates the processing sections 21, 51, which are sections for performing processing, on the basis of the processing information, which is included in the setting information stored in the storage section 43 (step S14). From step S14 until step S33 described later, the continuous sheet P is appropriately processed by the processing sections 21, 51. The controller 41 activates the image forming section 46 based on the image forming condition information, which is included in the setting information stored in the storage section 43 (step S15). From step S15 until step S37 described below, the image forming section 46 continues operation enabling image formation. The controller 41 refers to the print image list stored in the RAM 412 and determines whether or not there is remaining image identification information that has not been deleted yet (step S16).

If there is remaining image identification information (step S16; YES), the controller 41 determines whether the image identification information of the next image in the image formation order among the remaining image identification information in step S16 indicates the second or subsequent image (step S17). If the image identification information indicates the second or subsequent image (step S17; YES), the controller 41 determines whether it is possible to start image formation at a predetermined image repetition interval for the image of the next image identification information in the image formation order in the print image list (step S18). The predetermined image repetition interval (predetermined image interval) is an image interval from the last image formed on the continuous sheet P to the next image in normal image formation.

If it is possible to start the image formation (step S18; YES), the controller 41 reads the print data of the next image identification information in the image formation order in the print image list from the storage section 43 (step S19). In step S19, the controller 41 controls the sheet feed section 12, the processing section 21, the sheet adjustment section 31, the image forming section 46, the sheet conveyance section 49, the image inspection section 61 (conveyance of the continuous sheet P), the winding section 72, and the conveyance drive section T11 to start image formation on the continuous paper P for the read print data at the predetermined image interval. If the image identification information indicates not the second or subsequent image (step S17; NO), the process proceeds to step S19.

The controller 41 deletes from the print image list the image identification information of the image for which image formation has been started in step S19 (step S20). The controller 41 adds the image identification information of the image for which the image formation has been started in step S19 to an inspection list stored in RAM 412 (step S21). If step S21 is executed for the first time, a new inspection list including the image identification information of the image for which image formation has been started in step S19 is created and stored in RAM 412. The inspection list is a list in which the image identification information of the images for which image inspection is to be performed is stored in the order of the inspection.

As illustrated in FIG. 4, the controller 41 refers to the inspection list stored in the RAM 412 and determines whether there is any remaining image identification information that has not been deleted yet (step S22). If there is remaining image identification information (step S22; YES), the controller 41 determines whether the part of the continuous sheet P with the image of the next image identification information in the inspection order in the inspection list lies in inspection start timing (step S23). The inspection start timing is a timing immediately before a target image is conveyed to the image inspection section 61. If the part does not lie in the inspection start timing (step S23; NO), the process proceeds to step S16.

If the part lies in the inspection start timing (step S23; YES), the controller 41 controls the image inspection section 61 to read the image of the next image identification information in the inspection order in step S23 from the continuous sheet P (step S24). In step S24, the controller 41 acquires the read image data. Then, the controller 41 deletes the image identification information of the image read in step S19 from the inspection list (step S25).

The controller 41 compares the read image data acquired in step S25 with the print data corresponding to the image identification information of the read image data (step S26). In step S26, as image inspection processing, the controller 41 determines, based on the comparison result, whether or not the read image data includes an image defect. The image defects to be determined in step S26 includes an image formation defect and a processing defect. Examples of the image formation defect includes misregistration of the image of the read image data with respect to the print data, color misregistration of the image, density abnormality, a stain, and the like. The processing defect is a failure in processing by the processing sections 21, 51, and examples of which include processing position misalignment in processing such as varnishing and punching, uneven application of varnish as a failure in varnishing, a punching failure as a failure in punching, and the like.

When there is no image defect (step S26; NO), the process proceeds to step S16. If there is an image defect (step S26; YES), the controller 41 adds the image identification information of the image read in step S24 to a reprint list stored in the RAM 412 (step S27). The processing proceeds to step S16. If step S26 is executed for the first time, a reprint list including the image identification information of the image read in step S24 is created and stored in the RAM 412. The reprint list is a list that stores, in the order of image formation (in the order of reprinting), image identification information of images to be reprinted in response to an abnormality of read image data.

Returning to FIG. 3, if there is no remaining image identification information (step S16; NO), the controller 41 refers to the reprint image list stored in the RAM 412 (step S28). In step S28, the controller 41 determines whether there is remaining image identification information that has not been deleted from the reprint image list yet. If there is no remaining image identification information (step S28; NO), the processing proceeds to step S22. If there is remaining image identification information (step S28; YES), the controller 41 determines whether it is possible to restart image formation at an integral multiple image interval for the image of the next image identification information in the image formation order in the reprint image list (step S29). The integral multiple image interval is an integral multiple of the predetermined image interval of step S18 from the last image formed on the continuous sheet P and is the minimum image interval at which the reprinting can be performed.

If it is not possible to start the image formation (step S29; NO), the processing proceeds to step S22. If it is possible to start the image formation (step S29; YES), the controller 41 reads the print data of the next image identification information in the image formation order in the reprint image list from the storage section 43 (step S30). In step S30, the controller 41 controls the sheet feed section 12, the processing section 21, the sheet adjustment section 31, the image forming section 46, the sheet conveyance section 49, the image inspection section 61 (conveyance of the continuous sheet P), the winding section 72, and the conveyance drive section T11 to start image formation (reprinting) of the read print data on the continuous sheet P at the integral multiple image interval.

The controller 41 deletes the image identification information of the image for which image formation has been started in step S30 from the reprint image list (step S31).

The controller 41 adds the image identification information of the image for which the image formation has been started in step S30 to the inspection list stored in the RAM 412 (step S32). The processing proceeds to Step S22.

Returning to FIG. 4, if there is no remaining image identification information (step S22; NO), the controller 41 stops the processing sections 21, 51 (step S33). Determining step S22 being NO is substantially the same as determining not to reprint an image. Next, the controller 41 stops the sheet conveyance sections T1, 49 (step S34).

The controller 41 determines whether the image adjustment operation is necessary (step S35). The determination as to whether the image adjustment operation is necessary is made based on whether the image adjustment process is set to be executed in the image adjustment information of the setting information stored in the storage section 43 and the operation of the image forming system 1 satisfies the execution condition for executing the image adjustment operation. If the image adjustment operation is necessary (step S35; YES), the controller 41 causes the image forming section 46 to perform the image adjustment operation based on the image adjustment information (step S36). The execution condition for the image adjustment operation may be that the image forming distance (printing distance) on the continuous sheet P from the start of image formation to the last image formation is equal to or greater than a predetermined threshold value. Further, the execution condition of the image adjustment operation may be that the coverage (printing rate) of printing from the start of image formation to the last image formation is smaller than a predetermined threshold value. For example, when the continuous printing distance in the previous image formation is equal to or longer than 1000 m, a patch for density adjustment or color registration is formed on the intermediate transfer belt 472 by the image forming section main body 47. Further, when the average coverage in the previous image formation is less than 3%, a waste band is formed on the intermediate transfer belt 472 by the image forming section main body 47. The waste band maintains the stability of driving and cleaning of the intermediate transfer belt 472.

In the image adjustment operation, the waste band is formed for the purpose of maintaining the stability of the image forming system 1 itself. Therefore, the operation of forming the waste band is executed at the timing of step S36, and the system is configured to accept next printing after the completion of the operation. In the image adjustment operation, the image density adjustment and the color registration adjustment need to be performed before the next printing. Therefore, the system may be configured such that the image density adjustment and the color registration adjustment is performed not only at the timing of step S36 but also at the start of the next printing.

Next, the controller 41 stops the image forming section 46 (step S37) and terminates the image formation processing. If the image adjustment operation is not necessary (step S35; NO), the processing proceeds to step S37.

Figure 5A:
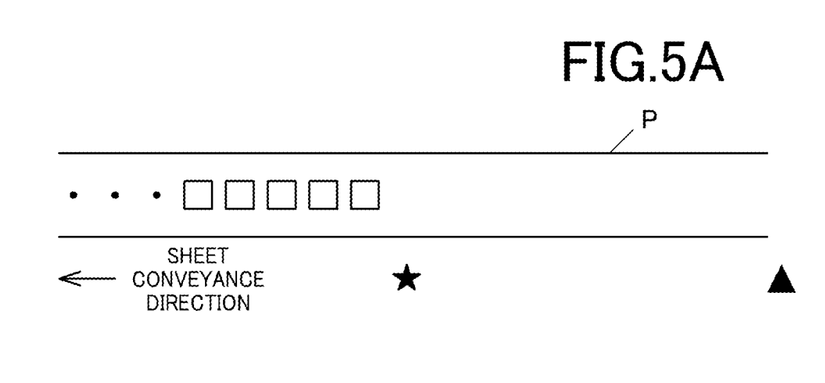
FIG. 5A illustrates an example of image formation on a continuous sheet in a case where there is no image defect in normal printing.
Figure 5B:
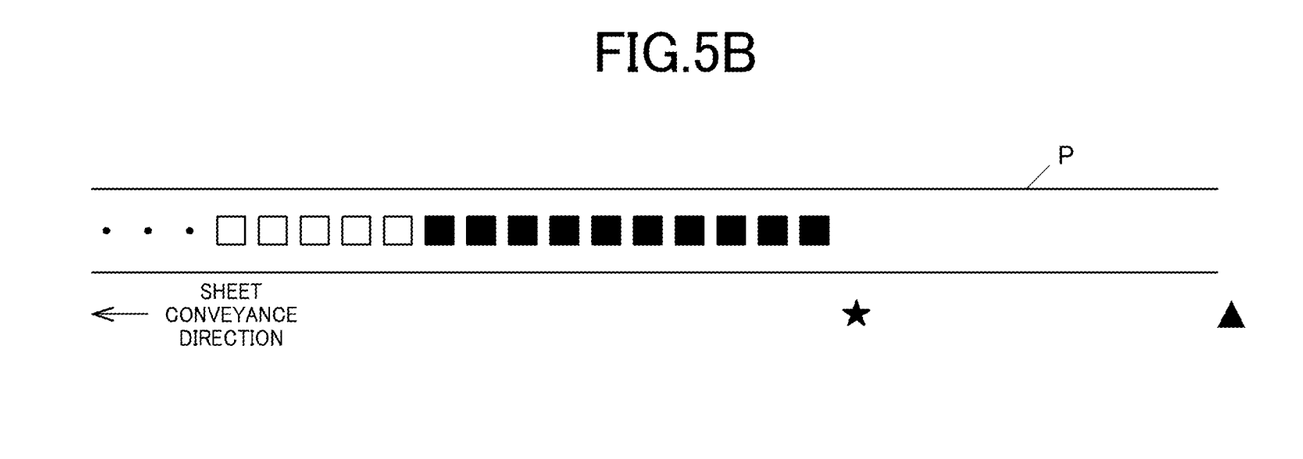
FIG. 5B illustrates an example of image formation a on continuous sheet in a case where there are image defects on many pages in normal printing.
Figure 6A:
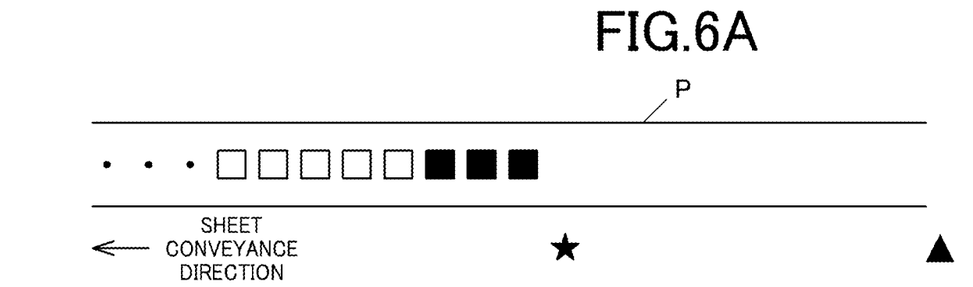
FIG. 6A illustrates an example of image formation on a continuous sheet in a case where there are image defects in a few pages away from the last page in normal printing.
Figure 6B:
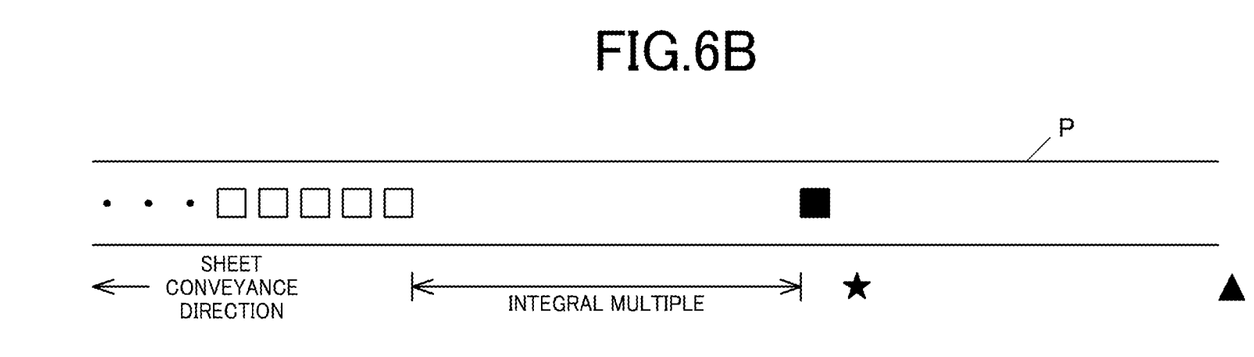
FIG. 6B illustrates an example of image formation on a continuous sheet in a case where there is an image defect only on the last page in normal printing.
Figure 7A:
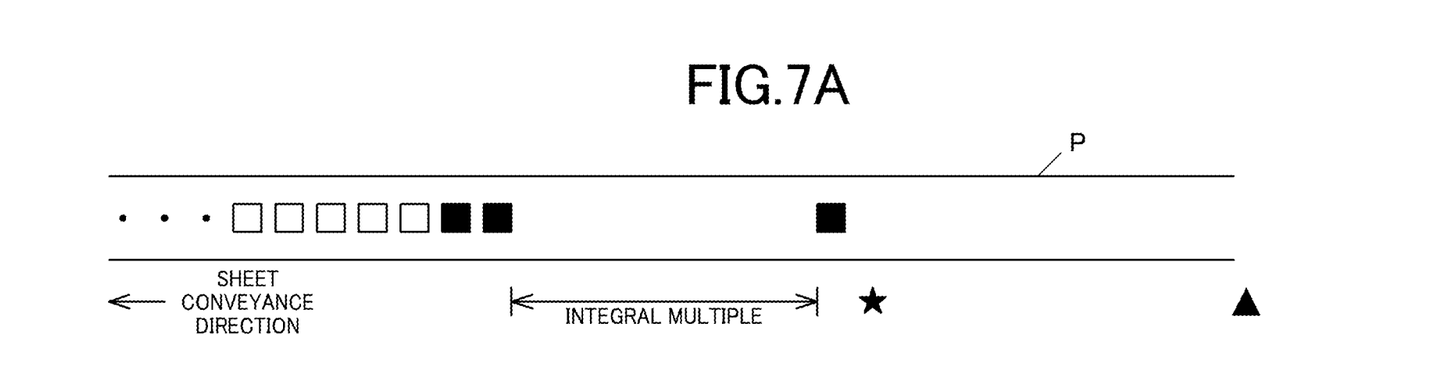
FIG. 7A illustrates an example of image formation on a continuous sheet in a case where there are image defects in a few pages including the last page in normal printing.
Figure 7B:
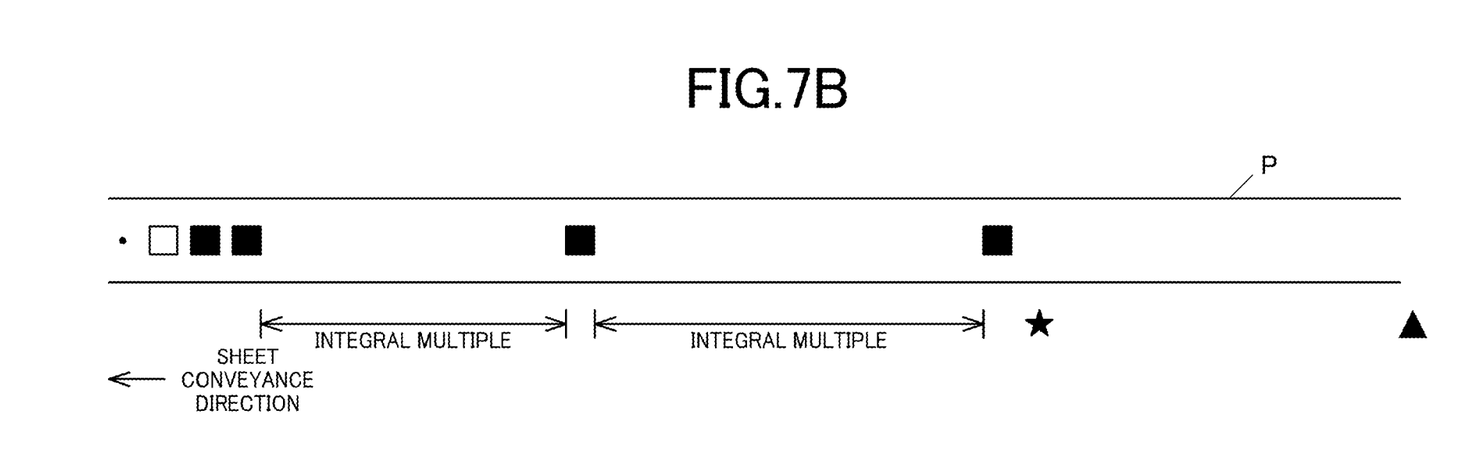
FIG. 7B illustrates an example of image formation on a continuous sheet in a case where there are image defects on a few pages including the last page in normal printing and there is also an image defect on the reprinted last page.

Next, specific image forming examples in the image formation processing will be described with reference to FIGS. 5A to 7B. FIG. 5A illustrates an example of image formation on the continuous sheet P in a case where there is no image defect in normal printing. FIG. 5B illustrates an example of image formation on the continuous sheet P in a case where there are image defects on many pages in normal printing. FIG. 6A illustrates an example of image formation on the continuous sheet P in a case where there are image defects in a few pages other than the pages near the last page in normal printing. FIG. 6B illustrates an example of image formation on the continuous sheet P in a case where there is an image defect only on the last page in normal printing. FIG. 7A illustrates an example of image formation on the continuous sheet P in a case where there is image defects in a few pages including the last page in normal printing. FIG. 7B illustrates an example of image formation on the continuous sheet P in a case where there are image defects on a few pages including the last page in normal printing, and there is also an image defect in the reprinted last page.

As shown in FIG. 5A, the example of image formation on the continuous sheet P in a case where there is no image defect in normal printing will be described. In the example, among the print data, a plurality of images to be formed at predetermined image intervals is referred to as a plurality of pages of images. In FIG. 5A, an image on the continuous sheet P formed by normal printing is indicated by "□ (blank square)", and an image formed by reprinting is indicated by "■ (solid square)". An image inspection end point, which is the position of the image forming section 46 (the image forming section main body 47) when the image inspection is ended (step S22 of the image formation processing described above; NO), is indicated by "★ (solid star)". An image formation stop point, which is the position of the image forming section 46 (image forming section main body 47) when the image formation on the continuous sheet P is stopped, is indicated by "▲ (solid triangle)". The image inspection end point is a point at which it is determined that there is no reprinting. The definitions of these symbols also apply to FIGS. 5B to 7B. The examples of image formation in FIG. 5A to FIG. 5B are examples in which processing is not performed.

In a case where there is no image defect in normal printing, a plurality of images is formed on the continuous sheet P in the normal printing in steps S16 to S21. Along with this, in steps S23 to S27, the image inspection of the images in the normal print is repeated. After the image on the last page is formed, since the determination in step S22 is NO, the image inspection ends at the image inspection end point. That is, it is determined that there is no reprinting, and the continuous sheet P is conveyed without image formation.

After the conveyance, in steps S34, S37, the conveyance of the continuous sheet P and the image formation are stopped at the image formation stop point.

As shown in FIG. 5B, the example of image formation on the continuous sheet P in a case where there are image defects on many pages in normal printing will be described. In such a case where there are image defects in a plurality of pages, a plurality of images is formed on the continuous sheet P in the normal printing in steps S16 to S21. Along with this, in steps S23 to S27, the image inspection is repeated. After the image of the last page is formed in normal printing, in steps S28 to S32, a plurality of images are formed on the continuous sheet P in the reprinting. The plurality of images corresponds to the images determined to have an image defect in the normal printing are formed. Further, the image inspection is repeated in steps S23 to S27. Since there are many pages of images having an image defect in the normal printing, the images having an image defect are reprinted at the integral multiple image intervals that are one time the predetermined image intervals in the normal printing in steps S29 and S30.

After the last page of image in the reprinting is formed, since the determination in step S22 is NO, the image inspection is ended at the image inspection end point. That is, it is determined that there is no reprinting, the continuous sheet P is conveyed without image formation. Thereafter in steps S34, S37, the conveyance of the continuous sheet P and the image formation are stopped at the image formation stop point.

As illustrated in FIG. 6A, the example of image formation on the continuous sheet P in a case where there are image defects in a few pages other than the pages near the last page in normal printing will be described. When there are image defects in a few pages except for the last page and the pages near the last page in the normal printing, a plurality of images is formed on the continuous sheet P in the normal printing in steps S16 to S21. Along with this, in steps S23 to S27, the image inspection is repeated. After the last page of image is formed in the normal printing, the plurality of images determined to have an image defect in the normal printing are reprinted on the continuous sheet P in steps S28 to S32. Along with this, in steps S23 to S27, the image inspection is repeated.

The images having an image defect in the normal printing does not exist near the last page, and the number of pages thereof is small. Therefore, in steps S29 and S30, reprinting is performed at the integral multiple image interval that is one time the predetermined image interval of the normal printing. The subsequent processing is the same as that in the image forming example of FIG. 5B.

As illustrated in FIG. 6B, the example of image formation on the continuous sheet P in a case where there is an image defect only on the last page in normal printing will be described. When there is an image defect only on the last page in the normal printing, a plurality of images is formed on the continuous paper P in the normal printing in steps S16 to S21. Along with this, in steps S23 to S27, the image inspection is repeated. After the last page of image is formed in the normal printing, the image determined to have an image defect in the normal printing is reprinted on the continuous sheet P in steps S28 to S32. Along with this, in steps S23 to S27, the image inspection is performed.

In this case, the image having an image defect is on the last page of the normal printing. Accordingly, in steps S29 and S30, the image formation cannot be performed at the integral multiple image interval that is one time the predetermined image interval of the normal printing. For this reason, for example, the image formation is performed at the integral multiple image interval that is 10 times the predetermined image interval, which is the shortest distance at which reprinting can be performed. The subsequent processing is the same as that in the image forming example of FIG. 5B.

As illustrated in FIG. 7A, the example of image formation on the continuous sheet P in a case where there are image defects in a few pages including the last page in normal printing will be described. When there are image defects in a few pages including the last page in the normal printing, a plurality of images is formed on the continuous sheet P in the normal printing in steps S16 to S21. Along with this, in steps S23 to S27, the image inspection is repeated. After the last page of image is formed in the normal printing, the plurality of images determined to have an image defect in the normal printing are reprinted on the continuous sheet P in steps S28 to S32. Along with this, in steps S23 to S27, the image inspection is performed.

There are image defects on the plurality of pages including the last page in the normal printing. Accordingly, in steps S29 and S30, it is not possible to perform image formation of the reprint images at the integral multiple image intervals that are one time the predetermined image intervals of the normal printing. Therefore, for example, the last page of the image in the reprinting is formed at the integral multiple image interval that is 8 times the predetermined image interval of the normal printing. The subsequent processing is the same as that in the image forming example of FIG. 5B.

As illustrated in FIG. 7B, the example of image formation on the continuous sheet P in a case where there are image defects on a few pages including the last page in normal printing and there is also an image defect on the last page in reprinting. When there are image defects in a few pages including the last page in the normal printing, a plurality of images is formed on the continuous sheet P in the normal printing in steps S16 to S21. Along with this, in steps S23 to S27, the image inspection is repeated. After the last page of image is formed in the normal printing, the plurality of images determined to have an image defect in the normal printing is reprinted on the continuous sheet P in steps S28 to S32. Along with this, in steps S23 to S27, the image inspection is performed.

There are image defects on the plurality of pages including the last page in the normal printing. Accordingly, in steps S29 and S30, it is not possible to perform image formation of the reprint images at the integral multiple image intervals that are one time the predetermined image intervals of the normal printing. Therefore, for example, the last page of image of the first reprinting is formed at the integral multiple image interval that is four times the predetermined image interval. Further, since there is also an image defect on the last page of the first reprinting, similarly, it is not possible to perform the image formation at the integral multiple image interval that is one time the predetermined image interval. Therefore, the image formation is performed at the integral multiple image interval that is ten times the predetermined image interval. The subsequent processing is the same as that in the image forming example of FIG. 5B.

As described above, according to the present embodiment, the image forming system 1 includes the sheet conveyance sections T1, 49, the image forming section 46, the image inspection section 61, and the controller 41. The sheet conveyance sections T1, 49 convey the continuous sheet P along the sheet conveyance path. The image forming section 46 forms an image on the continuous sheet P. The image inspection section 61 is disposed downstream of the image forming section 46 in the sheet conveyance path, reads an image formed on the continuous sheet, and generates the image data thereof. The controller 41 determines whether or not there is an image defect based on the read image data and determines whether or not to perform reprinting of the image determined to have an image defect based on the determination result. The controller 41 continues the operation of the image forming section 46 until it determines not to reprint an image.

Therefore, the operation of the image forming section 46 is continued until the reprinting is completed. That is, since the operation of the image forming section 46 is not stopped, when the image forming system 1 perform reprinting on the continuous sheet P, it can reduce a blank portion between the last image of the normal printing and the reprint image and a change in image quality between them.

The image forming section 46 includes the image forming section main body 47 that forms an image on the continuous sheet P and the fixing section 48 that fixes the formed image onto the continuous sheet P. Therefore, the image forming system 1 continues the operation of the fixing section 48. That is, since the operation of the fixing section 48 is not stopped, the image forming system 1 can reduce a blank portion between the last image of the normal printing and the reprint image and a change in image quality between them.

The controller 41 allows the sheet conveyance sections T1, 49 and the fixing section 48 to continue conveyance of the continuous sheet P in the same conveyance conditions as those in the image formation until determining not to perform reprinting. The conveyance conditions may include a conveyance speed and a pressure contact state. Therefore, the image forming system 1 continues the operation of the sheet conveyance section T1, 49 and the fixing section 48 under the same conveyance conditions until the reprinting is completed. Therefore, in the reprinting on the continuous sheet P, it is possible to further reduce the change in image quality between the last image of the normal printing and the reprint image.

The controller 41 determines whether or not there is an image defect by determining whether or not a defective image is included in the read image data. Therefore, the image forming system 1 can accurately determine the necessity of reprinting on the continuous sheet P.

When the controller 41 determines that the read image data includes a defective image, it determines to perform reprinting. Therefore, the image forming system 1 can quickly determine whether to perform reprinting on the continuous sheet P.

When the controller 41 determines that there is an image defect, it arranges the image to be reprinted at a position after the last image of the normal printing. Therefore, the image forming system 1 can further reduce the blank portion between the last image of the normal printing and the reprint image.

It is sometimes difficult to maintain the distance between an image to be reprinted and an image formed before the reprinting to the predetermined image interval of normal printing. In such cases, the controller 41 forms the image to be reprinted at the integral multiple image interval from the image formed before the reprinting. The integral multiple image interval is an integral multiple of the predetermined image interval and is the minimum image interval at which reprinting can be performed. Therefore, the image forming system 1 can readily perform post-processing on the reprint image without misregistration. The post-processing refers to the processing by the processing section 51.

The controller 41 determines whether the image is defective based on whether or not there is an image formation defect in the read image data. Therefore, the image forming system 1 can accurately determine whether there is an image defect due to an image formation defect.

The image forming system 1 includes the processing sections 21, 51 in the upstream of the image inspection section 61 in the sheet conveyance path. The controller 41 determines whether there is an image defect based on whether there is a failure of processing by the processing sections 21, 51 in the read image data. Therefore, the image forming system 1 can accurately determine whether there is an image defect due to a processing failure.

The controller 41 allows the processing sections 21, 51 to continue the processing until determining not to perform reprinting. Therefore, the image forming system 1 continues the operation of the processing sections 21, 51 until reprinting is completed. Therefore, when performing reprinting on the continuous sheet P, the image forming system 1 can further reduce the blank portion between the last image of the normal printing and the reprint image and the change in the quality of the printed matter.

The controller 41 does not perform the image adjustment processing that potentially cause a change in image quality until determining not to perform reprinting. The image adjustment processing may include image density adjustment, color registration adjustment, and/or formation of a waste band. Therefore, the image forming system 1 does not perform the image adjustment processing until the reprinting is completed. Therefore, when performing the reprinting on the continuous sheet P, the image forming system 1 can further reduce the blank portion between the last image of the normal printing and the reprint image and the change in image quality between them.

The above description discloses examples in which the storage section 43 (HDD, SSD, etc.) is used as a computer-readable medium for a program according to the present invention, but the present invention is not limited thereto. Other examples of applicable computer-readable media include a nonvolatile memory such as a flash memory, and a portable recording medium such as a CD-ROM. Furthermore, as a medium for providing the data of the program according to the present invention via a communication line, a carrier wave is also applicable to the present invention.

The description for the above embodiment merely illustrates examples of a preferred image forming system and program according to the present invention, and the present invention is not limited thereto.

For example, in the above-described embodiment, the image inspection device 60 (the image inspection section 61) reads the image formed on the continuous sheet P, and the controller 41 performs the determination (the image inspection processing) as to whether there is an image defect, which is performed as step S26 of the image formation processing. However, the present invention is not limited to this configuration. The system may be configured such that a second controller, which is different from the controller 41 as the first controller, performs the determination (processing related to image inspection) in step S26 as to whether there is an image defect under the control of the controller 41. The second controller may be included in the image forming apparatus 40 or may be included in the image inspection device 60 or the like.

The detailed configuration and detailed operation of each component constituting the image forming system 1 in the above-described embodiment can be appropriately changed without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image forming system, comprising:
a sheet conveyance section that conveys a continuous sheet along a sheet conveyance path;
an image forming section that forms an image on the continuous sheet;
an image reading section that is disposed downstream of the image forming section in the sheet conveyance path, and reads the image formed on the continuous sheet to generate image data; and
a hardware processor that determines, based on the read image data, whether or not there is an image defect, and in the case where the hardware processor determines the image defect does not exist until a last image of normal printing, determines not to perform reprinting of the image having the image defect, wherein
the hardware processor continues operation of the image forming section until the hardware processor determines not to perform the reprinting or that the reprinting is complete.

2. The image forming system according to claim 1, wherein
the image forming section includes:
an image forming section main body that forms the image on the continuous sheet; and
a fixing section that fixes the formed image onto the continuous sheet.

3. The image forming system according to claim 1, wherein the hardware processor causes the sheet conveyance section to continue conveyance of the continuous sheet in a same conveyance condition as a conveyance condition in image formation until the hardware processor determines not to perform the reprinting.

4. The image forming system according to claim 3, wherein the conveyance condition includes at least one of a conveyance speed or a pressure contact state.

5. The image forming system according to claim 1, wherein the hardware processor makes the determination as to whether there is the image defect based on whether a defective image is included in the read image data.

6. The image forming system according to claim 5, wherein the hardware processor determines to perform the reprinting in response to determining that the defective image is included in the read image data.

7. The image forming system according to claim 1, wherein in response to determining that there is the image defect, the hardware processor arranges the image to be reprinted at a position after a last image of normal printing.

8. The image forming system according to claim 7, wherein, in a case where an interval between the image to be reprinted and an image formed immediately before the reprinting cannot be maintained to a predetermined image interval of the normal printing, the hardware processor forms the image to be reprinted at an integral multiple image interval from the image formed before the reprinting, wherein the integral multiple image interval is an integral multiple of the predetermined image interval and is a minimum image interval at which the reprinting is performable.

9. The image forming system according to claim 1, wherein the hardware processor makes the determination as to whether there is the image defect based on whether an image formation defect is included in the read image data.

10. The image forming system according to claim 1, further comprising:
a processing section that is disposed upstream of the image reading section in the sheet conveyance path, wherein
the hardware processor makes the determination as to whether there is the image defect based on whether a processing defect by the processing section is included in the read image data.

11. The image forming system according to claim 10, wherein the hardware processor causes the processing section to continue processing until the hardware processor determines not to perform the reprinting.

12. The image forming system according to claim 1, wherein the hardware processor does not perform image adjustment processing that potentially causes a change in image quality until the hardware processor determines not to perform the reprinting.

13. The image forming system according to claim 12, wherein the image adjustment processing includes at least one of image density adjustment, color registration adjustment, or formation of a waste band.

14. A computer-readable computer-readable recording medium storing a program for an image forming system, the image forming system comprising:
a sheet conveyance section that conveys a continuous sheet along a sheet conveyance path;
an image forming section that forms an image on the continuous sheet; and
an image reading section that is disposed downstream of the image forming section in the sheet conveyance path, and reads the image formed on the continuous sheet to generate image data,
the program causing a computer of the image forming system to function as a hardware processor that determines, based on the read image data, whether or not there is an image defect, and in the case where the hardware processor determines the image defect does not exist until a last image of normal printing, determines not to perform reprinting of the image having the image defect, wherein
the hardware processor continues operation of the image forming section until the hardware processor determines not to perform the reprinting or that the reprinting is complete.

* * * * *